UNITED STATES PATENT OFFICE.

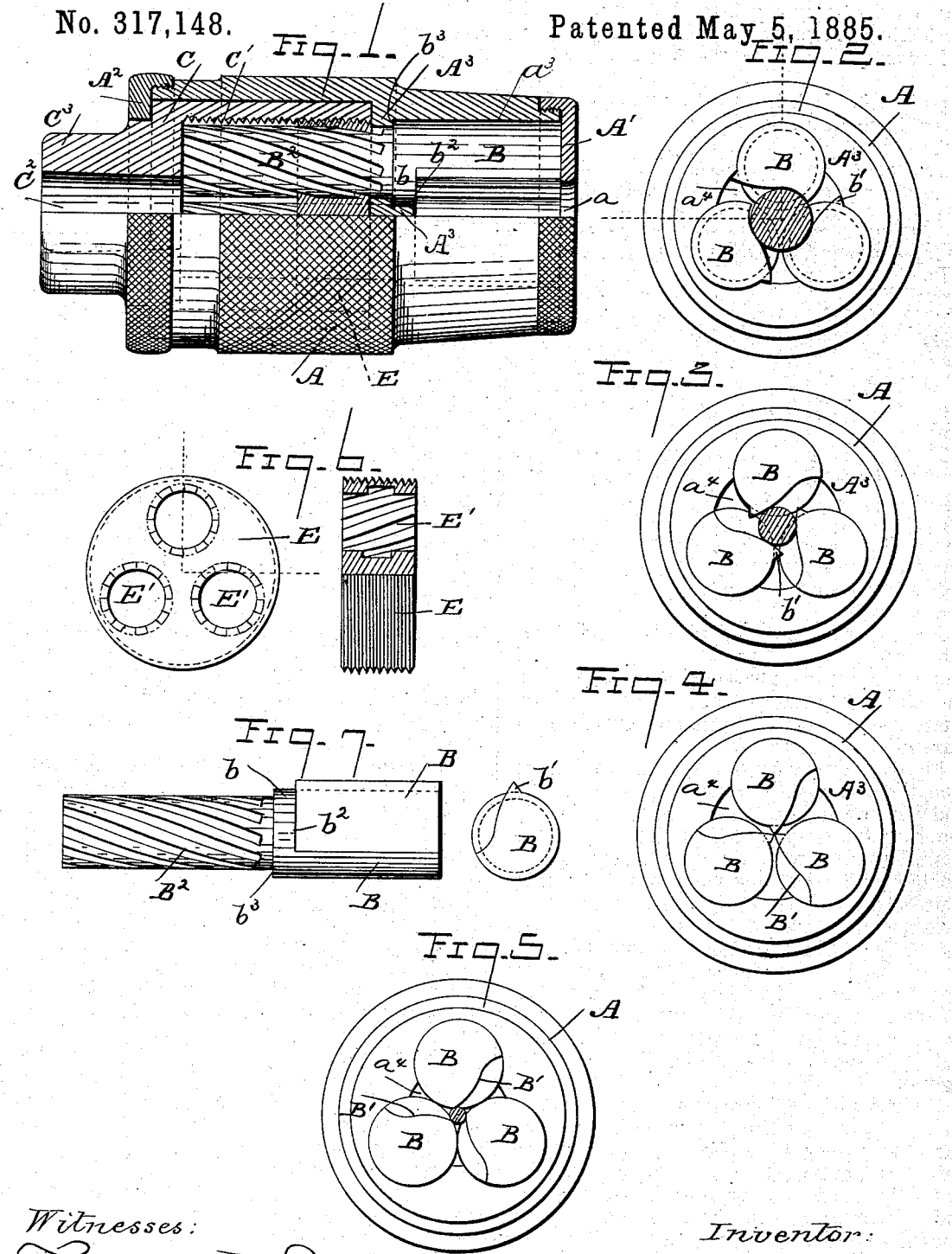

ABRAHAM B. LANDIS, OF WAYNESBOROUGH, PENNSYLVANIA.

DRILL-CHUCK.

SPECIFICATION forming part of Letters Patent No. 317,148, dated May 5, 1885.

Application filed March 3, 1885. (No model.)

*To all whom it may concern:*

Be it known that I, ABRAHAM B. LANDIS, a citizen of the United States, residing at Waynesborough, in the county of Franklin and State of Pennsylvania, have invented certain new and useful Improvements in Drill-Chucks, of which the following is a specification, reference being had therein to the accompanying drawings.

This invention relates to that class of chucks in which rotating crescent-shaped jaws are employed, which are contained in a shell or holder, and are rotated simultaneously, each on its own axis or center, and the gripping-edges of the jaws are thereby caused to approach or recede from a common center or tool-receiving space.

The object of my invention is to effect certain improvements in the construction of chucks of this class, whereby the operation of the chucks is rendered more certain and satisfactory than heretofore, and its efficiency and durability are increased.

Figure 1 represents a chuck, one half in section, the other half in elevation. Fig. 2 is an end view of the same with its end cap-piece removed and a large drill in section. Fig. 3 is a similar view with its jaws closed upon a smaller drill. Fig. 4 is a similar view with its jaws entirely closed. Fig. 5 is a modification showing an end view of jaws without gripping-lip. Fig. 6 is an end view of the threaded nut or disk having three holes with spiral grooves therein, and also a side view of the same with one half in section. Fig. 7 is a side view of one of the jaws and an end view of the same.

Like letters represent like parts in all the figures.

In the drawings, A represents the main outer shell of the chuck, which is provided with external screw-threads at both of its ends to receive cap-pieces A' and $A^2$. The cap-piece A' is smaller than the cap-piece $A^2$, and is provided with a central perforation, $a$, large enough to receive the shank of the largest-size drill. The interior of the shell A is divided into two chambers of different sizes by the partition $A^3$. The outer chamber has, besides the central opening, $a^4$, three or more semicircular recesses, $a^5$, the walls of which form peripheral bearings extending the whole length of the back or cylindrical portion $b$ of the jaws B. The inner chamber of the shell A receives a snugly-fitting bell-shaped sleeve, C, provided with a screw-thread, C', therein, and a tapering perforation, $C^2$, through the shank $C^3$ thereof. The screw-threaded sleeve C receives the threaded nut or disk E. (Shown in Fig. 6.) The disk E is provided with three holes, E', having spiral-cut or fluted ribs to enter and mesh with the spiral-cut grooves in the shanks $B^2$ of the jaws B. The location of the three holes E' corresponds with the three recesses in the outer chamber, $a^4$. The sleeve C is retained within the shell A by the cap-piece $A^2$, which is provided with a perforation large enough to receive the shank $C^3$ of the sleeve C. The gripping portion of each jaw may be straight or of a cylindrical form for about two-thirds of the circumference, and the balance presents first a concave and then a convex curve, B', and the latter extends a little beyond the circumference of the jaws, where it forms a gripping edge or lip, $b'$, to retain a very small drill or other tool.

The chuck is what is called "self-tightening"—that is, when in use the force applied to drive the drill is also utilized to clamp the same. When the drill or tool is secured in the chuck, it is firmly gripped by the face B', which prevents it from slipping or turning. It also presses against the shoulders $b^2$ of the three jaws B, and against the partition $A^3$ in the center of the shell. The shoulder $b$ likewise has a solid foundation against the bottom of said chamber and its recesses $a^3$, and thus the jaws present a solid backing for any size drill that may be used.

When it is desired to oil the interior of the chuck, the cap-piece $A^2$ can be easily and quickly removed and the chuck taken apart, but as dust cannot reach the threaded surfaces or any parts where there is very much wear its durability is thus manifest.

In Fig. 5 the jaws are shown without any lip, for convenience of manufacture, and will retain as small tools as is necessary to use with large chucks. In the chuck shown and described the backs of the jaws are seated the whole length thereof, whatever may be the size of the drill used, and as the jaws do not project from the shell no portion of said jaws can be strained out of line. The front cap-piece, A', sustains the extremity of the jaws against the thrust while opening the jaws. Other means can be used to sustain this thrust without departing from the spirit of my invention. After the jaws have been closed, the end-thrust is borne by the shoulder $b^3$ against the partition $A^3$; but the shoulder $b^3$ may also be dispensed with and the end-thrust of the jaws and drill be upon the end of the shank $B^2$ and against the inner plane face of the sleeve C.

The surface of the shell A is milled to obtain a good hold on it while securing the drill. This is done by turning said shell while the sleeve C and its shank $C^3$ are fast upon the mandrel of a lathe or drilling-machine.

By rotating the shell or body A and the jaws carried thereby the disk E is turned within the sleeve C, and said disk having spiral grooves meshing with the spiral grooves on the shanks of the jaws, the disk is drawn back over said shanks and the jaws are rotated so as to close on the drill.

Having now fully described my invention, I claim—

1. In a chuck, the combination of the main shell A with an internal partition, $A^3$, provided with three cylindrical bearings, with the bell-shaped sleeve C, provided with a hollow shank, $C^3$, and the cap-piece $A^2$, uniting them, substantially as and for the purpose described.

2. In a chuck, the internally-screw-threaded sleeve C, provided with a hollow shank, $C^3$, in combination with the externally-threaded nut or disk E, provided with three holes, E', having spirally-cut or fluted ribs, and spirally-grooved jaws, substantially as and for the purpose described.

3. In a chuck, the internally-screw-threaded sleeve C, and nut or disk E therein, in combination with jaws B, provided with curved gripping-faces B', and shanks $B^2$, provided with spirally-cut grooves, substantially as and for the purpose described.

4. In a chuck, the shell A, having the perforated partition $A^3$ therein, in combination with the jaws B, provided with gripping-faces B', cylindrical portion $b$, shank $B^2$, provided with spiral-cut grooves, and a cap-piece, A', provided with a central perforation, $a$, substantially as and for the purpose described.

5. In a chuck, the jaw B, provided with gripping-face B', and shank $B^2$, having spiral grooves, substantially as and for the purpose described.

6. In a chuck, the shell A, and removable caps A' and $A^2$ at the ends thereof, in combination with the internally-screw-threaded sleeve C, the disk E and jaws B, substantially as and for the purpose described.

7. In a chuck, the jaws B, having the gripping-face B', with lips $b'$ projecting beyond the side of said jaws, and shanks having spiral grooves thereon, substantially as and for the purpose described.

In testimony whereof I affix my signature in presence of two witnesses.

ABRAHAM B. LANDIS.

Witnesses:
D. M. GOOD, JR.,
P. H. GARVER.